United States Patent
Suenaga

(10) Patent No.: US 11,163,629 B2
(45) Date of Patent: Nov. 2, 2021

(54) MONITOR AND MONITORING CONTROL METHOD

(71) Applicant: FUJITSU LIMITED, Kawasaki (JP)

(72) Inventor: Naoki Suenaga, Samukawa (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 16/432,330

(22) Filed: Jun. 5, 2019

(65) Prior Publication Data

US 2020/0004620 A1    Jan. 2, 2020

(30) Foreign Application Priority Data

Jul. 2, 2018    (JP) .............................. JP2018-126123

(51) Int. Cl.
     *G06F 11/07*      (2006.01)

(52) U.S. Cl.
     CPC ...... *G06F 11/0772* (2013.01); *G06F 11/0751* (2013.01)

(58) Field of Classification Search
     CPC ............. G06F 11/0772; G06F 11/0751; G06F 11/0757
     USPC ......................................................... 714/57
     See application file for complete search history.

(56) References Cited

U.S. PATENT DOCUMENTS

| | | | | |
|---|---|---|---|---|
| 2004/0151113 A1* | 8/2004 | Zakrzewski | .......... | H04L 47/283 370/230 |
| 2004/0153823 A1* | 8/2004 | Ansari | ............... | G06F 11/0715 714/38.14 |
| 2005/0198285 A1* | 9/2005 | Petit | ......................... | H04L 67/42 709/225 |
| 2006/0264203 A1* | 11/2006 | Hall | ......................... | H04L 51/24 455/412.1 |
| 2016/0277305 A1 | 9/2016 | Tajiri | | |

FOREIGN PATENT DOCUMENTS

| | | |
|---|---|---|
| JP | 2006-080615 | 3/2006 |
| JP | 2016-177358 | 10/2016 |

OTHER PUBLICATIONS

Wikipedia "error detection and correction" page, retrieved from https://en.wikipedia.org/wiki/Error_detection_and_correction (Year: 2021).*

* cited by examiner

*Primary Examiner* — Yair Leibovich
(74) *Attorney, Agent, or Firm* — Fujitsu Patent Center

(57) ABSTRACT

A monitor includes a processor configured to detect an error that occurs in an information processing apparatus. The processor is configured to collect information on the detected error. The processor is configured to calculate an interval for checking a progress of the collection of the information. The processor is configured to check the progress of the collection of the information when the interval elapses. The processor is configured to output the collected information when the collection of the information is completed. The processor is configured to continue the collection of the information when there is a progress in collecting the information or when a value of the interval is increased from a previously calculated value of the interval.

12 Claims, 15 Drawing Sheets

FIG. 3

MONITORING TARGET PROGRESS INFORMATION (108)

| INFORMATION | DESCRIPTION | MONITORING TARGET SPECIFIED | PROGRESS CHECKED |
|---|---|---|---|
| LOG ID | SERIAL NUMBER SET FOR EACH ERROR. MONITORING TARGET IS DISCRIMINATED BASED ON SERIAL NUMBER. | ○ | |
| ABNORMALITY TYPE | TYPE OF ERROR TO BE MONITORED. SINCE SIZE OF DETAILED INFORMATION COLLECTED FOR EACH ERROR IS DIFFERENT, MONITORING SECONDS IS DETERMINED BY REFERRING TO ERROR DEFINITION WITH THIS INFORMATION AS KEY. | ○ | |
| PREVIOUS PROGRESS RATE | COLLECTION PROGRESS RATE OF DETAILED INFORMATION. VALUE PREVIOUS TO ONE IS HELD FOR PROGRESS STATE DETERMINATION. | | ○ |
| CURRENT PROGRESS RATE | COLLECTION PROGRESS RATE OF DETAILED INFORMATION. PROGRESS RATE AT THIS POINT OF TIME IS ACQUIRED FOR PROGRESS STATE DETERMINATION. | | ○ |
| PREVIOUS INTERVAL | SECONDS USED FOR PROGRESS MONITORING INTERVAL VALUE PREVIOUS TO ONE IS HELD FOR PROGRESS STATE DETERMINATION. | | ○ |
| CURRENT INTERVAL | SECONDS USED FOR PROGRESS MONITORING INTERVAL VALUE AT THIS POINT OF TIME IS CALCULATED FOR PROGRESS STATE DETERMINATION. | | ○ |

FIG. 4

ERROR DEFINITION INFORMATION 106

| INFORMATION | DESCRIPTION | MULTIPLEX | LOAD |
|---|---|---|---|
| DEFAULT PROGRESS MONITORING SECONDS BY MULTIPLICITY | DEFAULT PROGRESS MONITORING SECONDS USED FOR PROGRESS MONITORING INTERVAL DETERMINATION ACCORDING TO MULTIPLICITY | ○ | |
| DEFAULT PROGRESS MONITORING SECONDS FOR EACH ABNORMALITY TYPE | DEFAULT PROGRESS MONITORING SECONDS FOR EACH ABNORMALITY TYPE. DEFAULT PROGRESS MONITORING SECONDS FOR EACH ABNORMALITY TYPE USED FOR PROGRESS MONITORING INTERVAL DETERMINATION ACCORDING TO DEVICE LOAD | | ○ |

FIG. 5

DEFAULT PROGRESS MONITORING SECONDS
FOR EACH ABNORMALITY TYPE

| ABNORMALITY TYPE | DEFAULT PROGRESS MONITORING SECONDS |
|---|---|
| PSU | 10 SECONDS |
| MEM | 30 SECONDS |
| CPU | 50 SECONDS |

APPARATUS STATE INFORMATION

| INFORMATION | DESCRIPTION | MULTIPLEX | LOAD |
|---|---|---|---|
| MEMORY USAGE RATE | USED TO MEASURE LOAD OF INFORMATION PROCESSING APPARATUS | | ○ |
| REPORT MULTIPLICITY | NUMBER OF DETAILED INFORMATION COLLECTIONS BEING OPERATED | ○ | |

FIG. 13

WEIGHT FOR EACH ABNORMALITY TYPE

| ABNORMALITY TYPE | WEIGHT |
|---|---|
| CDU | 2 |
| PSU | 1 |
| CPU | 5 |
| MEM | 3 |

MONITOR AND MONITORING CONTROL METHOD

CROSS-REFERENCE TO RELATED APPLICATION

This application is based upon and claims the benefit of priority of the prior Japanese Patent Application No. 2018-126123, filed on Jul. 2, 2018, the entire contents of which are incorporated herein by reference.

FIELD

The embodiments discussed herein are related to a monitor and a monitoring control method.

BACKGROUND

A remote maintenance system that monitors an information processing apparatus from a maintenance center at a remote location is known.

In the remote maintenance system of the related art, for example, the information processing apparatus to be monitored is provided with a control board such as a BMC (Baseboard Management Controller), and when any error (abnormality) is detected in the information processing apparatus, the control board reports the detected error to the maintenance center.

FIG. 15 is a sequence diagram for explaining an error detecting process in the remote maintenance system of the related art.

The remote maintenance system 500 illustrated in FIG. 15 includes a control board 501 and a maintenance center 505.

The control board 501 is included in an information processing apparatus to be monitored (not illustrated), and includes an error detection unit 502, a log collection unit 503, and a reporting unit 504.

The error detection unit 502 detects the occurrence of an error in the information processing apparatus. For example, when an error occurs in a power supply unit (PSU), a CPU (Central Processing Unit), a MEM (Memory), or the like included in the information processing apparatus, the error detection unit 502 detects the error.

The log collection unit 503 collects detailed information on the error detected by the error detection unit 502. The detailed information includes, for example, a log related to the error.

The reporting unit 504 transmits information on the error to the maintenance center 505. For example, the information processing apparatus (the control board 501) and the maintenance center 505 are interconnected via a communication network such as a LAN (Local Area Network), and the reporting unit 504 reports the error to the maintenance center 505 via the communication network.

The reporting unit 504 transmits two reports, that is, an abnormality report (first report) notifying the maintenance center 505 that an error has occurred and then a detailed information report (second report) on errors collected by the log collection unit 503, to the maintenance center 505.

The abnormality report (first report) is transmitted to the maintenance center at a timing when an error is detected by the error detection unit 502. Further, the detailed information report (second report) is transmitted to the maintenance center after completion of the collection of the detailed information by the log collection unit 503.

However, since the reporting unit 504 does not wait indefinitely until the detailed information collection by the log collection unit 503 is completed, a timeout time is set, and the collection of detailed information by the log collection unit 503 is not completed within the timeout time. In this case, the transmission of the detailed information report (second report) is not performed.

In the sequence diagram illustrated in FIG. 15, first, when the error detection unit 502 detects an error (see an arrow "A1"), the reporting unit 504 is requested to report the detected error (see an arrow "A2"). The reporting unit 504 starts a reporting process (see an arrow "A3") and first transmits an abnormality report (first report) to the maintenance center 505 (see an arrow "A4").

While the abnormality report (first report) is transmitted, measurement of the timeout time for detailed information collection by the log collection unit 503 is started (see an arrow "A5").

The error detection unit 502 performs a log registration on the log collection unit 503 (see an arrow "A6"), whereby the log collection unit 503 starts collection of detailed information on the detected error (see an arrow "A7").

The reporting unit 504 checks on the log collection unit 503 whether the collection of the detailed information has been completed (see an arrow "A8"). The check on the log collection unit 503 is periodically repeated. As a result of the check on the log collection unit 503, when the collection of the detailed information has been completed (see an arrow "A9"), the reporting unit 504 sends the detailed information (second report) of the error to the maintenance center 505 (see an arrow "A10") and completes the reporting process.

The maintenance center 505 analyzes the cause of the error using the detailed information sent from the control board 501 (the reporting unit 504) of the information processing apparatus.

Related techniques are disclosed in, for example, Japanese Laid-open Patent Publication No. 2016-177358 and Japanese Laid-open Patent Publication No. 2006-080615.

In such a remote maintenance system of the related art, when errors occur frequently in a plurality of points of the information processing apparatus, the log collection unit 503 performs detailed information collection of the errors in parallel. This may lead to increased load of detailed information collection and increased time taken for detailed information collection in the control board 501 of the information processing apparatus. As a result, the detailed information collection may not be completed due to the timeout.

For example, a case is considered where the error detection unit 502 detects an error in each of the PSU, the CPU, and the MEM in the information processing apparatus.

The reporting unit 504 notifies the maintenance center 505 of a PSU error report (first report), a CPU error report (first report), and a MEM error report (first report), and then the log collection unit 503 collects detailed information of errors in the PSU, the CPU, and the MEM in parallel.

The parallel collection of a plurality of pieces of detailed information by the log collection unit 503 increases the load on the processor of the control board 501. As a result, for example, although the collection of the detailed information of the error of the PSU may be completed, the collection of the detailed information of each error of the CPU and the MEM may be timed-out and not completed.

That is, although the reporting unit 504 notifies the maintenance center 505 of the detailed information on the PSU error as a PSU abnormality report (second report), the reporting unit 504 is unable to notify the maintenance center 505 of the detailed information on the CPU error (CPU abnormality report (second report)) and the detailed information on the MEM error (MEM abnormality report (second report)). The maintenance center 505 is unable to analyze the causes of the CPU and MEM errors because there is no detailed information on these errors.

SUMMARY

According to an aspect of the present invention, provided is a monitor including a processor configured to detect an error that occurs in an information processing apparatus. The processor is configured to collect information on the detected error. The processor is configured to calculate an interval for checking a progress of the collection of the information. The processor is configured to check the progress of the collection of the information when the interval elapses. The processor is configured to output the collected information when the collection of the information is completed. The processor is configured to continue the collection of the information when there is a progress in collecting the information or when a value of the interval is increased from a previously calculated value of the interval.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a view for explaining monitoring target progress information in the remote maintenance system according to the embodiment;

FIG. 4 is a view for explaining error definition information in the remote maintenance system according to the embodiment;

FIG. 5 is a view illustrating a default progress monitoring second number for each abnormality type in the remote maintenance system according to the embodiment;

FIG. 6 is a view for explaining the configuration of apparatus state information in the remote maintenance system according to the embodiment;

FIG. 13 is a view illustrating a weight for each abnormality type in the remote maintenance system according to a modification of the embodiment;

DESCRIPTION OF EMBODIMENTS

Figure 1:
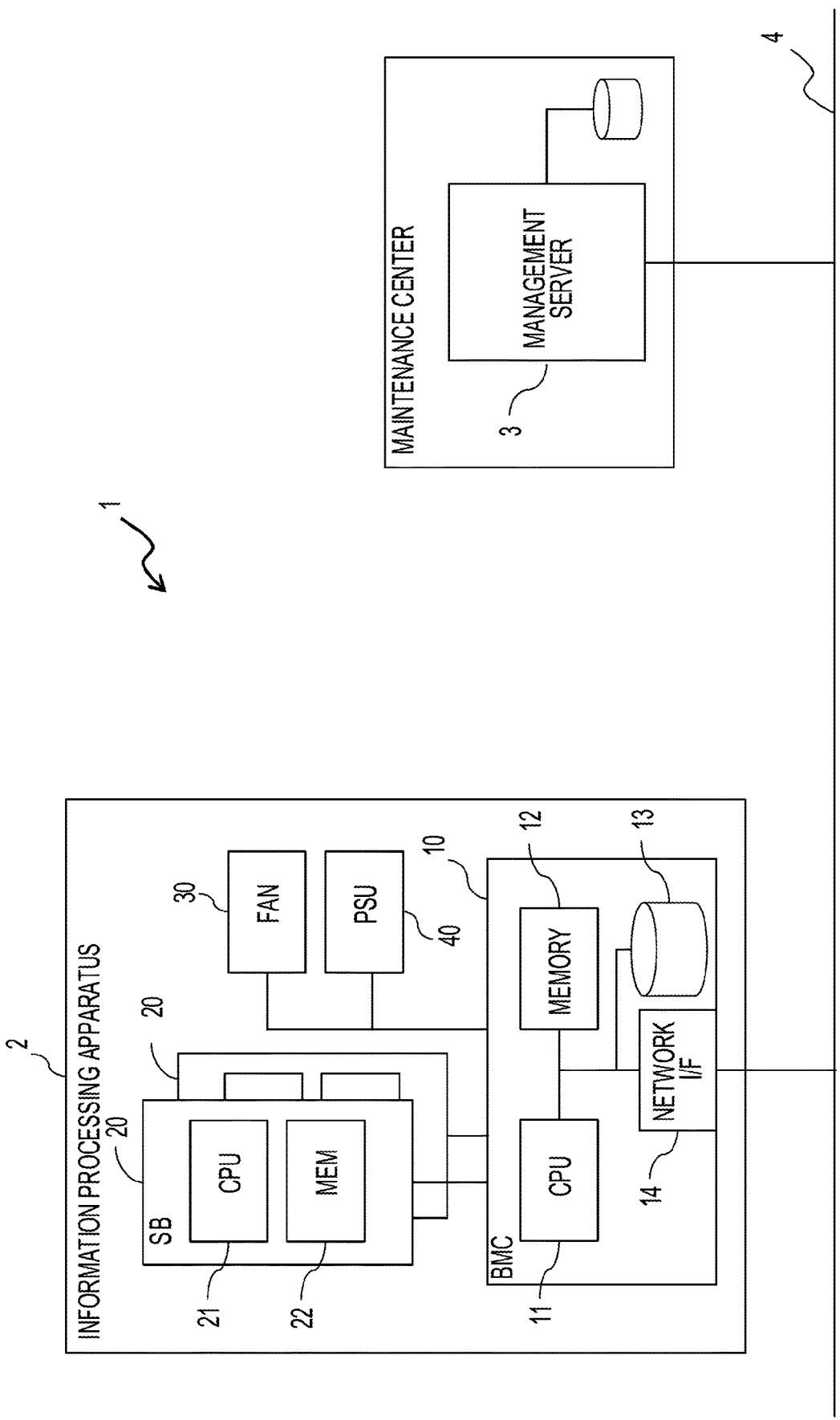
FIG. 1 is a view illustrating the configuration of a remote maintenance system according to an embodiment.

Hereinafter, embodiments of a monitor, a monitoring control method, and an information processing apparatus will be described with reference to the accompanying drawings. However, the embodiments described below are merely examples, and there is no intention to exclude application of various modifications and techniques that are not specified in the embodiments. That is, the embodiments may be modified and implemented in various ways without departing from the spirit and scope of the present disclosure. In addition, the drawings are not intended to include only the components illustrated in the drawings, but may include other functions and the like.

(A) Configuration

Figure 2:
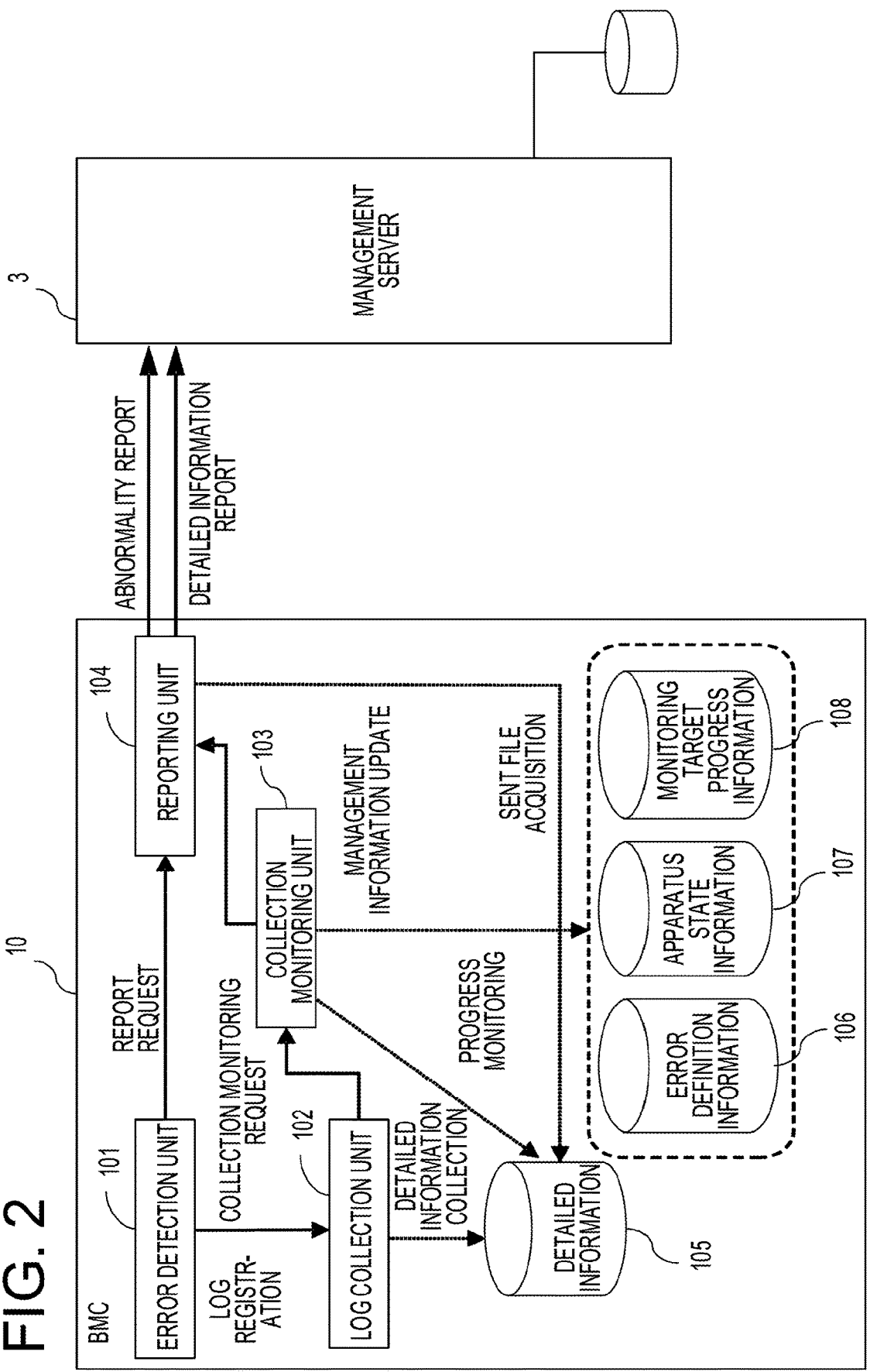
FIG. 2 is a functional configuration view of the remote maintenance system according to the embodiment.

FIG. 1 is a view illustrating the configuration of a remote maintenance system 1 according to an embodiment, and FIG. 2 is a functional configuration view thereof.

As illustrated in FIG. 1, the remote maintenance system 1 includes an information processing apparatus 2 that is a maintenance target (monitoring target), and a management server 3 that manages the information processing apparatus 2. The information processing apparatus 2 and the management server 3 are communicably connected via a communication network 4 such as a LAN.

The information processing apparatus 2 is, for example, a server computer used by a customer for work or the like. The information processing apparatus 2 has components which may cause certain errors (faults and failures).

In the example illustrated in FIG. 1, the information processing apparatus 2 includes a plurality of system boards (SBs) (two SBs in the example illustrated in FIG. 1) 20, a BMC 10, a FAN 30, and a PSU 40.

The SBs 20 have the same configuration, and include, for example, a CPU (Central Processing Unit) 21 and a memory (MEM) 22.

The CPU 21 is a processing device that performs various controls and calculations, and implements various functions by executing an operating system (OS) and programs stored in the memory 22 or the like.

The memory 22 is a storage area that temporarily stores various data and programs, such as a DIMM (Dual Inline Memory Module) or the like.

The PSU 40 is a power supply that supplies power to each unit in the information processing apparatus 2. The FAN 30 is a cooling device that cools heat sources such as the CPU 21, the PSU 40 and the like provided in the information processing apparatus 2 by blowing air to the heat sources.

Further, in the information processing apparatus 2, the CPU 21, the memory 22, the FAN 30, the PSU 40, and other electronic components not illustrated may cause certain kinds of failures, which are called hardware elements (or hardware components).

Among the CPU 21, the memory 22, the FAN 30, the PSU 40, and other electronic components in the information processing apparatus 2, a hardware element in which certain failure has occurred may be referred to as a failure generation component.

The BMC 10 is a monitor that monitors and maintains the information processing apparatus 2. The BMC 10 is connected to the CPU 21, the memory 22, the FAN 30, the PSU 40, and the like via a bus or the like, and controls and monitors these operations.

As illustrated in FIG. 1, the BMC 10 includes a CPU 11, a memory 12, a storage device 13, and a network interface (I/F) 14.

The network interface 14 is connected to a communication network 4 and communicates data with the management server 3 and other communication devices via the communication network 4.

The memory 12 is a storage memory including a read only memory (ROM) and a random access memory (RAM). A software program that monitors the information processing apparatus 2 and data for this program are written in the ROM of the memory 12. The software program on the memory 12 is appropriately read and executed by the CPU 11. The RAM of the memory 12 is used as a primary storage memory or a working memory.

The storage device 13 is a storage device such as a hard disk drive (HDD), a solid state drive (SSD), a storage class memory (SCM), or the like, and stores various data.

The storage device 13 stores detailed information 105, error definition information 106, apparatus state information 107, and monitoring target progress information 108 illustrated in FIG. 2. The detailed information 105, the error definition information 106, the apparatus state information 107, and the monitoring target progress information 108 are appropriately read on the memory 12 and used by the CPU 11.

The detailed information 105 is detailed information on errors that have occurred in failure generation components of the information processing apparatus 2. For example, the detailed information 105 includes the specific contents of the errors, a log that represents a process performed in the information processing apparatus 2 before and after the errors occur, the calculation results, etc. The detailed information 105 is collected by the log collection unit 102 (to be described later), and stored in the storage device 13.

In the information processing apparatus 2, the BMC 10 monitors the occurrence of an error in the information processing apparatus 2. That is, in the remote maintenance system 1, an error occurring in the information processing apparatus 2 is a monitoring target, and information related to the error is monitoring target information.

The monitoring target progress information 108 is information on an error that has occurred in the information processing apparatus 2, and includes information indicating the progress of collection of detailed information on an error by the log collection unit 102 (to be described later).

FIG. 3 is a view for explaining the monitoring target progress information 108 in the remote maintenance system 1 according to the embodiment, and illustrates the configuration of the monitoring target progress information 108.

The monitoring target progress information 108 illustrated in FIG. 3 includes, as information, a log identification (ID), an abnormality type, a previous progress rate, a current progress rate, a previous interval, and a current interval.

The log ID is identification information that identifies (discriminates) an error to be monitored using, for example, a unique serial number set for each error.

The abnormality type is information indicating the type of an error, for example, a location where the error has occurred. For example, an abnormality type "CPU" is set for an error detected in the CPU 21. Similarly, an abnormality type "MEM" is set for an error detected in the memory 22, and an abnormality type "PSU" is set for an error detected in the PSU 40.

For example, the abnormality type may be set by an error detection unit 101 that has detected an error, or may be set by a log collection unit 102 or a collection monitoring unit 103, and may be implemented in various ways.

Since the information (detailed information 105) collected according to the abnormality type is different and hence its size is also different, the load of collection of the detailed information 105 is also different. For example, for an error related to the CPU 21, the amount of information collected as the detailed information 105 tends to be large, and the collection of the detailed information 105 becomes a higher load on the BMC 10. In the meantime, for an error related to the memory 22, the amount of information collected as the detailed information 105 tends to be small, and the collection of the detailed information 105 becomes a lower load on the BMC 10.

In the information processing apparatus 2, it is possible to determine whether the collection of the detailed information 105 becomes a higher load or a lower load on the BMC 10 by referring to the abnormality type.

In order to determine whether the collection of the detailed information 105 becomes a higher load or a lower load on the BMC 10, prepared information which associates the abnormality type with information indicating whether the collection of the detailed information 105 becomes a higher load or a lower load may be referred to.

The current progress rate is a progress rate of collection of the detailed information 105 by the log collection unit 102, which is calculated by the collection monitoring unit 103 (to be described later), and the latest progress rate of collection of the detailed information 105 being currently collected by the log collection unit 102.

The previous progress rate is a progress rate of the collection of the detailed information 105 by the log collection unit 102, which is calculated by the collection monitoring unit 103 (to be described later), and the historical progress rate of collection of the detailed information 105 collected previously (one before) by the log collection unit 102.

The current interval is the latest value of a progress monitoring interval, which is calculated by the collection monitoring unit 103 (to be described later), and is the value of the latest progress monitoring interval updated by the collection monitoring unit 103. The previous interval is a value of the progress monitoring interval calculated by the collection monitoring unit 103, and is a value calculated previously last time (one before). The progress monitoring interval will be described later.

Then, of the monitoring target progress information 108, the log ID and the abnormality type are used as information that identifies a monitoring target. Further, of the monitoring target progress information 108, the previous progress rate, the current progress rate, the previous interval, and the current interval are used to monitor the progress of collection of the detailed information 105 by the log collection unit 102.

The error definition information 106 is used to manage a default progress monitoring second number (initial value of a monitoring seconds number, or reference monitoring time) that is used to calculate the progress monitoring interval by the collection monitoring unit 103.

FIG. 4 is a view for explaining the error definition information 106 in the remote maintenance system 1 according to the embodiment.

The error definition information 106 illustrated in FIG. 4 includes, as information, a default progress monitoring second number by multiplicity (second reference monitoring time) and a default progress monitoring second number for each abnormality type (first reference monitoring time).

The default progress monitoring second number by multiplicity is used by the collection monitoring unit 103 to determine the progress monitoring interval using a calculation formula using the multiplicity, as will be described later.

The default progress monitoring second number for each abnormality type is used by the collection monitoring unit 103 to determine the progress monitoring interval using a calculation formula using the device load, as will be described later.

FIG. 5 is a view illustrating the default progress monitoring second number for each abnormality type in the remote maintenance system 1 according to the embodiment.

The default progress monitoring second number for each abnormality type is configured by associating the default progress monitoring second number with the abnormality type.

In the default progress monitoring second number for each abnormality type illustrated in FIG. 5, the default progress monitoring second number "10 seconds" is set for the abnormality type "PSU". Similarly, the default progress monitoring second number "30 seconds" is set for the abnormality type "MEM", and the default progress monitoring second number "50 seconds" is set for the abnormality type "CPU".

The apparatus state information 107 is information indicating the state of the information processing apparatus 2, and in particular, the load state of the BMC 10. FIG. 6 is a view for explaining the configuration of the apparatus state information 107 in the remote maintenance system 1 according to the embodiment.

In the example illustrated in FIG. 6, the apparatus state information 107 includes, as information, a memory usage rate and a report multiplicity.

The memory usage rate indicates the usage rate of the memory 12 of the BMC 10 and is expressed with, for example, a percentage. The report multiplicity is generated in parallel in the information processing apparatus 2 and indicates the number of errors dealt by the BMC 10.

Both the memory usage rate and the report multiplicity indicate the load state of the BMC 10. That is, a higher memory usage rate indicates a higher load state of the BMC 10, and a higher report multiplicity indicates a higher load state of the BMC 10.

The error definition information 106, the apparatus state information 107, and the monitoring target progress information 108 are all stored in, for example, the storage device 13 or the memory 12 of the BMC 10 and used by the collection monitoring unit 103 (to be described later).

The memory usage rate is used by the collection monitoring unit 103 (to be described later) to calculate the progress monitoring interval using a calculation formula that uses the device load. The report multiplicity is used by the collection monitoring unit 103 to calculate the progress monitoring interval using a calculation formula that uses the multiplicity.

The CPU 11 is a processing device that performs various controls and calculations, and implements various functions by executing the OS and programs stored in the memory 12. That is, as illustrated in FIG. 2, the CPU 11 implements the functions as the error detection unit 101, the log collection unit 102, the collection monitoring unit 103, and the reporting unit 104.

Then, the CPU 11 of the BMC 10 functions as the error detection unit 101, the log collection unit 102, the collection monitoring unit 103, and the reporting unit 104 by executing a monitoring control program.

A program (monitoring control program) that implements the functions as the error detection unit 101, the log collection unit 102, the collection monitoring unit 103, and the reporting unit 104 is provided in a form which is recorded on a readable recording medium such as a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a Blu-ray disc, a magnetic disk, an optical disk, a magneto-optical disk, etc. Then, the BMC (computer) 10 reads the program from the recording medium, transfers the program to an internal storage device or an external storage device, and stores and uses it. Alternatively, the program may be recorded in a storage device (recording medium) such as a magnetic disk, an optical disk, a magneto-optical disk, etc. and may be provided from the storage device to the computer via a communication path.

When implementing the functions as the error detection unit 101, the log collection unit 102, the collection monitoring unit 103, and the reporting unit 104, the program stored in the internal storage device (the memory 12 of the BMC 10 in this embodiment) is executed by a microprocessor (the CPU 11 in this embodiment) of the computer. At this time, the computer may read and execute the program recorded on the recording medium.

The error detection unit 101 detects the occurrence of errors in the information processing apparatus 2. For example, when abnormalities occur in the CPU 11, the memory 12, the FAN 30, the PSU 40, and the like included in the information processing apparatus 2, the error detection unit 101 detects the abnormalities.

The detection of errors in the information processing apparatus 2 by the error detection unit 101 may be implemented using various known methods, and therefore, the explanation thereof will be omitted.

When detecting an error that has occurred in the information processing apparatus 2, the error detection unit 101 notifies the error to the reporting unit 104 and requests the reporting unit 104 to send a report (first report) to the management server 3 (the maintenance center) (report request).

Further, when detecting an error in the information processing apparatus 2, the error detection unit 101 notifies the occurrence of the error to the log collection unit 102 and causes the log collection unit 102 to perform a log registration for the error and start the collection of the detailed information 105.

The log collection unit 102 collects the detailed information 105 on the error detected by the error detection unit 101.

The log collection unit 102 collects, as the detailed information 105, information corresponding to the abnormality type of the error. For example, the log collection unit 102 may refer to prescribed reference information (not illustrated) to acquire information (e.g., log information) prescribed according to the abnormality type of the error from the memory 22 and the like of the information processing apparatus 2.

The collection of the detailed information 105 on the error by the log collection unit 102 may be implemented using various known methods, and therefore, the explanation thereof will be omitted.

The collection monitoring unit 103 monitors log collection by the log collection unit 102. That is, the collection monitoring unit 103 checks the progress of collection of detailed information by the log collection unit 102.

For example, when an abnormality occurs in the information processing apparatus 2, the collection monitoring unit 103 grasps the load state of the BMC 10. Then, the collection monitoring unit 103 calculates the progress monitoring interval according to the load state of the BMC 10, and checks the progress of collection of detailed information again at a timing when the progress monitoring interval has elapsed.

When determining that the BMC 10 is in a high load state, the collection monitoring unit 103 calculates the progress monitoring interval by multiplying the first reference monitoring time (the default progress monitoring second number for each abnormality type) by a value according to the memory usage rate.

For example, the collection monitoring unit 103 determines the progress monitoring interval using the following calculation formula (1) that uses the device load.

$$\text{Progress monitoring interval }(s)=\text{Default progress monitoring second number for each abnormality type }(s) \times \text{Memory usage rate }(u) \quad (1)$$

In the above formula (1), the default progress monitoring second number (s) for each abnormality type is a value defined in the error definition information 106 (see, e.g., FIGS. 4 and 5), and the memory usage rate (u) is the usage rate of the memory 12 of the BMC 10 set in the apparatus state information 107 (see, e.g., FIG. 6).

For example, when an error is detected in the CPU 21 of the information processing apparatus 2, in the example illustrated in FIG. 5, the default progress monitoring second number of the abnormality type "CPU" is 50 seconds. In this case, when the memory usage rate is 70% (u=0.7), the progress monitoring interval may be obtained by the following formula.

$$\text{Progress monitoring interval }(s)=50 \times 0.7=35 \text{ (seconds)}$$

Further, the determination as to whether the BMC 10 is in a high load state is made, for example, by checking whether the memory usage rate of the BMC 10 is equal to or higher than a threshold value. A state in which the memory usage rate of the BMC 10 is lower than the threshold value may be set as the reference state.

When it is determined that the BMC 10 is not in a high load state, the collection monitoring unit 103 calculates the progress monitoring interval by multiplying the second reference monitoring time (the default progress monitoring second number by multiplicity) by a value corresponding to the multiplicity of errors.

For example, the collection monitoring unit 103 determines the progress monitoring interval using the following calculation formula (2) that uses the multiplicity.

$$\text{Progress monitoring interval }(s)=\text{Default progress monitoring second number by multiplicity }(s) \times \text{Report multiplicity }(m) \quad (2)$$

In the above formula (2), the default progress monitoring second number by multiplicity (s) is a value defined in the error definition information 106 (see, e.g., FIG. 4), and the report multiplicity (m) is a report multiplicity set in the apparatus state information 107 (see, e.g., FIG. 6).

For example, when an error is detected in the memory 12, the memory usage rate is 40% (40<x), the default progress monitoring second number by multiplicity is 1 second, and the report multiplicity is 2 (m=2), the progress monitoring interval is obtained by the following formula.

$$\text{Progress monitoring interval }(s)=1 \times 2=2 \text{ (seconds)}$$

When the usage rate of the memory 12 of the BMC 10 is equal to or higher than a predetermined threshold value (x %) (x is an arbitrary number), the collection monitoring unit 103 determines that the BMC 10 is in a high load state (first state). In this case, the collection monitoring unit 103 calculates the progress monitoring interval based on the calculation formula (1) that uses the load of the BMC 10 (the load of the entire device) based on the abnormality type of error.

When the usage rate of the memory 12 of the BMC 10 is lower than the predetermined threshold value (x %) and the report multiplicity is equal to or higher than a predetermined first threshold value (e.g., 5), the collection monitoring unit 103 determines that the BMC 10 is not in a high load state but in an error multiplex state (second state) where errors occur frequently at the same time. In this case, the collection monitoring unit 103 calculates the progress monitoring interval based on the calculation formula (2) using the error multiplicity.

In a case where the usage rate of the memory 12 of the BMC 10 is lower than the predetermined threshold value (x %) and the report multiplicity is lower than the first threshold value, even when the frequency of high load errors is lower than a predetermined second threshold value (e.g., 3), the collection monitoring unit 103 determines that the BMC 10 is in a high load state (third state).

Even in this case, the collection monitoring unit 103 calculates the progress monitoring interval based on the calculation formula (1) using the load of the BMC 10 (the load of the entire device) based on the abnormality type of error.

In a case where the usage rate of the memory 12 of the BMC 10 is lower than the predetermined threshold value (x %) and the report multiplicity is lower than 5, when the frequency of high load errors is lower than the predetermined threshold value (e.g., 3), the collection monitoring unit 103 determines that the BMC 10 is not in a high load state but in a state (fourth state) where errors do not occur frequently at the same time. In this case, the collection monitoring unit 103 calculates the progress monitoring interval based on the calculation formula (2) using the error multiplicity.

The collection monitoring unit 103 may recalculate the progress monitoring interval when there is no progress in the collection of the detailed information 105 by the log collection unit 102 for the error detected by the error detection unit 101, that is, when the progress rate does not increase.

The progress of collection of the detailed information 105 for an error varies depending on the detailed information, but, for example, when the data size of a file (log file) collected as the detailed information 105 becomes larger, it may be considered that the progress rate is increasing.

For example, when the size of a log file, which finally becomes 1024 KB, is 700 KB in the previous time and 800 KB in the current time, it may be considered that the progress rate is increasing. Even when the number of files collected as the detailed information 105 is increasing, it may be considered that the progress rate is increasing.

For example, assuming that it is planned to collect three files as the detailed information 105, when one file is collected in the previous time and the second file is collected in this time, it may be considered that the progress rate is increasing.

Then, the collection monitoring unit 103 compares the calculated progress monitoring interval with the previously calculated progress monitoring interval and performs a control to continuously monitor the error even when the progress monitoring interval is increasing. That is, the control is performed such that collection of the detailed information 105 by the log collection unit 102 is continuously performed without interrupting monitoring of the error.

In addition, the collection monitoring unit 103 performs a control to continuously monitor the error when there is a progress in the collection of the detailed information 105 by the log collection unit 102 for the error detected by the error detection unit 101, that is, when the progress rate is increasing. That is, the control is performed such that the collection of the detailed information 105 by the log collection unit 102 is continuously performed without timing-out the monitoring of the error.

Further, for the error detected by the error detection unit 101, the collection monitoring unit 103 compares the calculated progress monitoring interval with the previously calculated progress monitoring interval and performs a control to continuously monitor the error even when the progress monitoring interval is increasing. That is, the control is performed such that the collection of the detailed information 105 by the log collection unit 102 is continuously performed without timing-out the monitoring of the error.

The reporting unit 104 notifies (reports) information on an error detected in the information processing apparatus 2 to the management server 3. The reporting unit 104 is an output unit that outputs the detailed information 105 collected by the log collection unit 102 to the outside of the management server 3 or the like.

When the error detection unit 101 detects an error in the information processing apparatus 2, the reporting unit 104 first notifies the management server 3 of an abnormality report (first report) notifying that an error has occurred.

After notifying the management server 3 of the abnormality report (first report), when the progress monitoring interval set by the collection monitoring unit 103 elapses, the reporting unit 104 checks the progress of collection of the detailed information 105 by the log collection unit 102 for the collection monitoring unit 103 (determination of a progress monitoring interval).

After that, each time the progress monitoring interval elapses, the reporting unit 104 checks the progress of collection of the detailed information 105 by the log collection unit 102 for the collection monitoring unit 103 (determination of a progress monitoring interval).

When the collection of the detailed information 105 by the log collection unit 102 is completed, the reporting unit 104 performs a detailed information report (second report) to notify the collected detailed information 105 on the error to the management server 3.

The management server 3 is a server computer having a server function and is communicably connected to the information processing apparatus 2 via the communication network 4. The communication network 4 is, for example, a LAN.

The management server 3 is included, for example, in a maintenance center that manages the information processing apparatus 2. The maintenance center may be installed at a remote place physically separated from the installation place of the information processing apparatus 2.

The management server 3 analyzes the cause of the error using the detailed information sent from the BMC 10 (the reporting unit 104) of the information processing apparatus 2.

(B) Operation

According to the sequence diagrams illustrated in FIGS. 7 and 8, descriptions will be made on a process in a case where a plurality of errors are detected in the information processing apparatus 2 in the remote maintenance system 1 according to the embodiment configured as described above.

Figure 7:
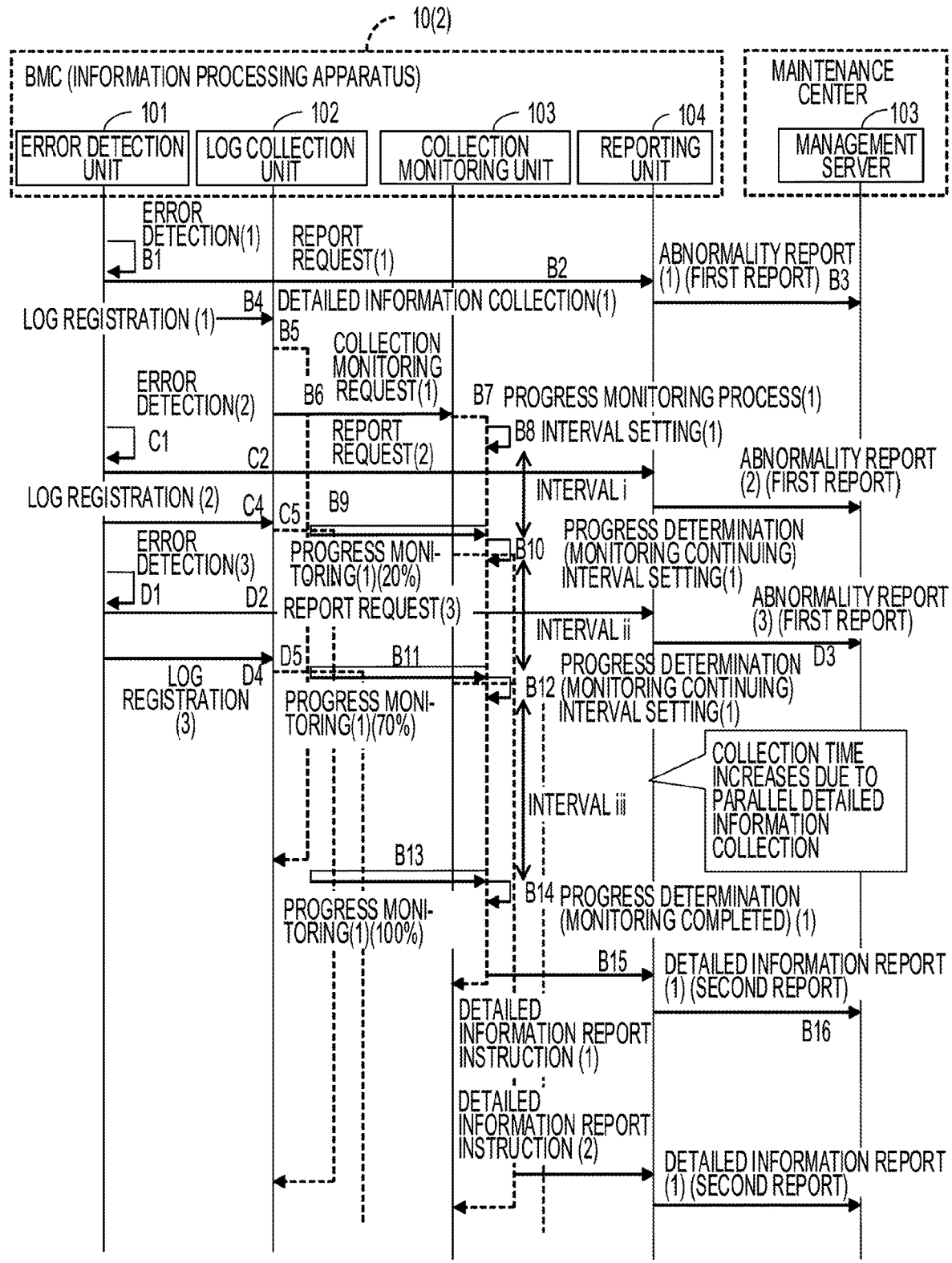
FIG. 7 is a sequence diagram for explaining a process when a plurality of errors are detected in the information processing apparatus in the remote maintenance system according to the embodiment.

FIG. 7 illustrates an example in which the error detection unit 101 performs three error detections represented as error detections (1) to (3). Further, in FIG. 7, among the three error detections, descriptions will be made focusing on a process for the first error detection (1). In this figure, broken lines indicate threads.

The error detection unit 101 performs the error detection (1) (see reference numeral "B1" in FIG. 7) and then sends a report request to the reporting unit 104 (see reference numeral "B2" in FIG. 7). The report request for the error detection (1) is referred to as a report request (1).

The reporting unit 104 transmits an abnormality report (first report) on the error detection (1) to the management server 3 (see reference numeral "B3" in FIG. 7). The abnormality report on the error detection (1) is referred to as an abnormality report (1).

In addition, the error detection unit 101 performs a log registration on the log collection unit 102 (see reference numeral "B4" in FIG. 7), whereby the log collection unit 102 starts to collect the detailed information 105 on the error detection (1) (see reference numeral "B5" in FIG. 7).

The log collection unit 102 requests the collection monitoring unit 103 to monitor the progress of the error detection (1) (see reference numeral "B6" in FIG. 7). The request for monitoring the progress of the error detection (1) is referred to as a progress monitoring request (1).

The collection monitoring unit 103 starts a progress monitoring process for the error detection (1) (see reference numeral "B7" in FIG. 7). Hereinafter, the progress monitoring process for the error detection (1) is referred to as a progress monitoring process (1). In addition, the collection monitoring unit 103 sets (calculates) a progress monitoring interval (see reference numeral "B8" in FIG. 7). Hereinafter, the interval setting for the error detection (1) will be referred to as interval setting (1). This initially-set progress monitoring interval is referred to as an interval i.

In addition, the error detection unit 101 performs the error detection (2) (see reference numeral "C1" in FIG. 7) and sends a report request to the reporting unit 104 (see reference numeral "C2" in FIG. 7). The report request for the error detection (2) is referred to as a report request (2). The reporting unit 104 sends an abnormality report (first report) on the error detection (2) to the management server 3 (see reference numeral "C3" in FIG. 7).

In addition, the error detection unit 101 performs a log registration for the error detection (2) on the log collection unit 102 (see reference numeral "C4" in FIG. 7), whereby the log collection unit 102 starts to collect the detailed information 105 on the error detection (2) for the collection monitoring unit 103 (see reference numeral "C5" in FIG. 7).

Since the interval i has elapsed, the collection monitoring unit 103 monitors (checks) the progress of collection of the detailed information for the log collection unit 102 (see reference numeral "B9" in FIG. 7). Hereinafter, the progress monitoring from the collection monitoring unit 103 to the log collection unit 102 for the error detection (1) will be referred to as progress monitoring (1). In the example illustrated in FIG. 7, the result of the progress monitoring (1) at this timing is a progress rate of 20%.

Since the progress rate of the detailed information on the error detection (1) is increasing (0%→20%), the collection monitoring unit 103 determines that the progress monitoring is continuously performed (see reference numeral "B10" in FIG. 7). The collection monitoring unit 103 also sets a progress monitoring interval. This secondly-set progress monitoring interval is referred to as an interval ii.

Further, the error detection unit 101 performs the error detection (3) (see reference numeral "D1" in FIG. 7) and sends a report request to the reporting unit 104 (see reference numeral "D2" in FIG. 7). The report request for the error detection (3) is referred to as a report request (3). The reporting unit 104 sends an abnormality report (first report) on the error detection (3) to the management server 3 (see reference numeral "D3" in FIG. 7).

In addition, the error detection unit 101 performs a log registration for the error detection (3) on the log collection unit 102 (see reference numeral "D4" in FIG. 7), whereby the log collection unit 102 starts to collect the detailed information 105 on the error detection (3) for the collection monitoring unit 103 (see reference numeral "D5" in FIG. 7).

Since the interval ii has elapsed, the collection monitoring unit 103 monitors (checks) the progress of collection of the detailed information for the log collection unit 102 (see reference numeral "B11" in FIG. 7). In the example illustrated in FIG. 7, the result of the progress monitoring (1) at this timing is a progress rate of 70%.

Since the progress rate of the detailed information on the error detection (1) is increasing (20%→70%), the collection monitoring unit 103 determines that the progress monitoring is continuously performed (see reference numeral "B12" in FIG. 7). The collection monitoring unit 103 also sets a progress monitoring interval. This thirdly-set progress monitoring interval is referred to as an interval iii.

Here, in the BMC 10, as a result of the plurality of error detections (1) to (3) being performed, since the log collection unit 102 performs three detailed information collections in parallel, the load on the log collection unit 102 increases. Accordingly, the interval iii for the error detection (1) is longer than the interval i.

Since the interval iii has elapsed, the collection monitoring unit 103 monitors (checks) the progress of collection of the detailed information for the log collection unit 102 (see reference numeral "B13" in FIG. 7). In the example illustrated in FIG. 7, the result of the progress monitoring (1) at this timing is a progress rate of 100%.

Since the progress rate of the detailed information on the error detection (1) has reached 100%, the collection monitoring unit 103 determines that the progress monitoring has been completed (see reference numeral "B14" in FIG. 7).

The collection monitoring unit 103 instructs the reporting unit 104 to report the detailed information 105 on the error detection (1) (detailed information report instruction (1): see reference numeral "B15" in FIG. 7). According to this instruction, the reporting unit 104 reports the detailed information 105 (second report) to the management server 3 (detailed information report (1) (second report): see reference numeral "B16" in FIG. 7).

Next, according to the sequence diagram illustrated in FIG. 8, descriptions will be made on a process in a case where a plurality of errors are detected in the information processing apparatus 2 in the remote maintenance system 1 according to the embodiment In FIG. 8, among the three error detections (1) to (3), descriptions will be made focusing on a process for the second error detection (1).

In the figure, the same reference numerals as those already described denote the same processes, and therefore, the explanation thereof will be omitted. In the figure, broken lines indicate threads.

Figure 8:
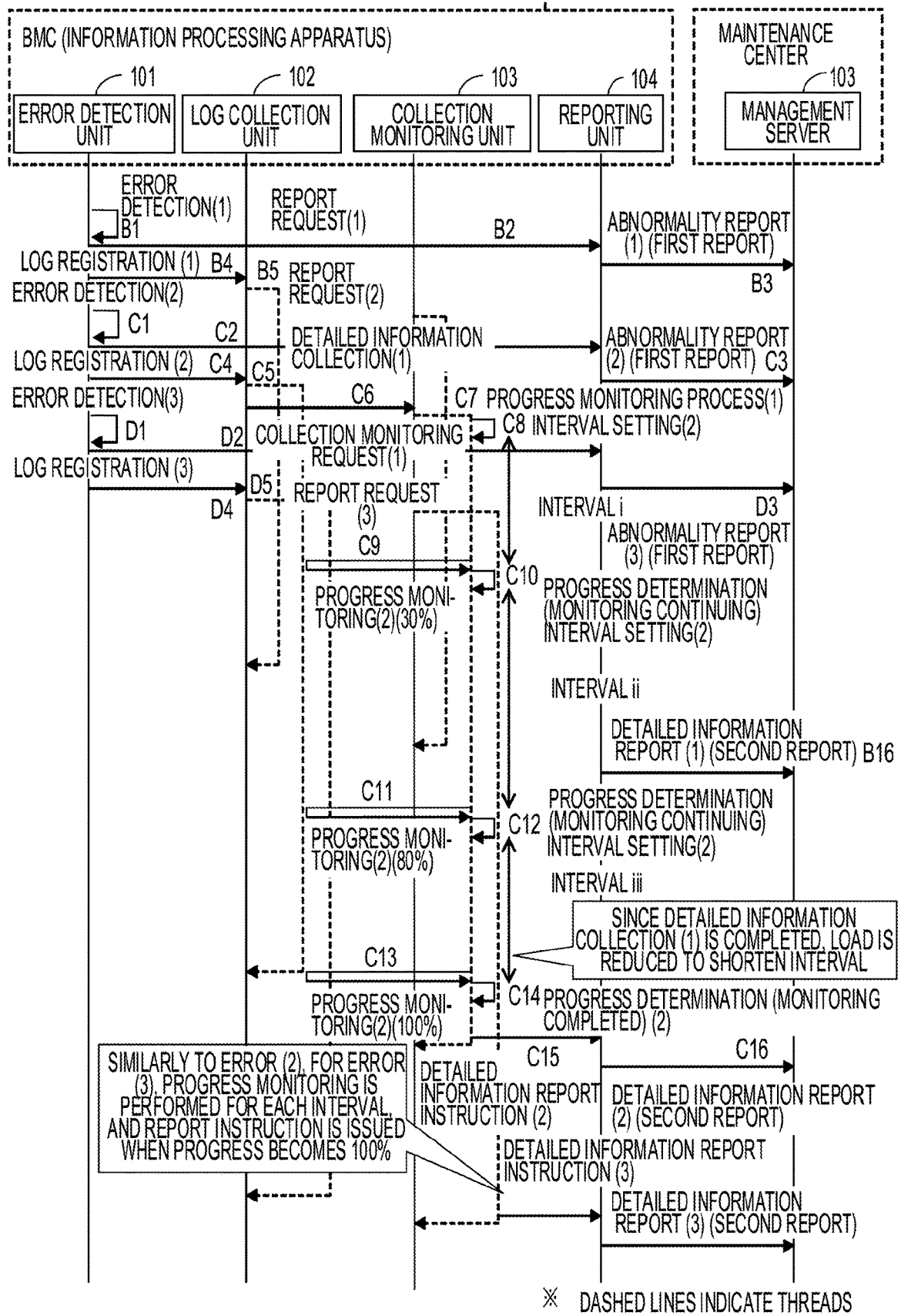
FIG. 8 is a sequence diagram for explaining a process when a plurality of errors are detected in the information processing apparatus in the remote maintenance system according to the embodiment.

The error detection unit 101 performs the error detection (1) (see reference numeral "B1" in FIG. 8) and then sends a report request to the reporting unit 104 (see reference numeral "B2" in FIG. 8). The report request for the error detection (1) is referred to as a report request (1). The reporting unit 104 transmits an abnormality report (first report) on the error detection (1) to the management server 3 (see reference numeral "B3" in FIG. 8). The abnormality report on the error detection (1) is referred to as an abnormality report (1).

In addition, the error detection unit 101 performs a log registration on the log collection unit 102 (see reference numeral "B4" in FIG. 8), whereby the log collection unit 102 starts to collect the detailed information 105 on the error detection (1) (see reference numeral "B5" in FIG. 8). The log registration for the error detection (1) is referred to as log registration (1).

Further, the error detection unit 101 performs the error detection (2) (see reference numeral "C1" in FIG. 8) and then sends a report request to the reporting unit 104 (see reference numeral "C2" in FIG. 8). The report request for the error detection (2) is referred to as a report request (2). The reporting unit 104 transmits an abnormality report (first report) on the error detection (2) to the management server 3 (see reference numeral C3 in FIG. 8). The abnormality report on the error detection (2) is referred to as an abnormality report (2).

In addition, the error detection unit 101 performs log registration for the error detection (2) on the log collection unit 102 (see reference numeral C4 in FIG. 8), whereby the log collection unit 102 starts to collect the detailed information 105 on the error detection (2) for the collection monitoring unit 103 (see reference numeral C5 in FIG. 8). The log registration for the error detection (2) is referred to as log registration (2).

The log collection unit 102 requests the collection monitoring unit 103 to monitor the progress of the error detection (2) (see reference numeral C6 in FIG. 8). The request for monitoring the progress of the error detection (2) is referred to as a progress monitoring request (2).

The collection monitoring unit 103 starts a progress monitoring process for the error detection (2) (see reference numeral "C7" in FIG. 8). Hereinafter, the progress monitoring process for the error detection (2) will be referred to as a progress monitoring process (2). In addition, the collection monitoring unit 103 sets a progress monitoring interval (see reference numeral "C8" in FIG. 8). This initially-set progress monitoring interval is referred to as an interval i.

In addition, the error detection unit 101 performs the error detection (3) (see reference numeral "D1" in FIG. 8) and sends a report request to the reporting unit 104 (see reference numeral "D2" in FIG. 8). The report request for the error detection (3) is referred to as a report request (3). The reporting unit 104 sends an abnormality report (first report) on the error detection (3) to the management server 3 (see reference numeral "D3" in FIG. 8). The abnormality report on the error detection (3) is referred to as an abnormality report.

In addition, the error detection unit 101 performs a log registration for the error detection (3) on the log collection unit 102 (see reference numeral "D4" in FIG. 8), whereby the log collection unit 102 starts to collect the detailed information 105 on the error detection (3) for the collection monitoring unit 103 (see reference numeral "D5" in FIG. 8). The log registration for the error detection (3) is referred to as log registration (3).

Since the interval i has elapsed, the collection monitoring unit 103 monitors (checks) the progress of collection of the detailed information for the log collection unit 102 (see reference numeral "C9" in FIG. 8). Hereinafter, the progress monitoring from the collection monitoring unit 103 to the log collection unit 102 for the error detection (2) will be referred to as progress monitoring (2). In the example illustrated in FIG. 8, the result of the progress monitoring (2) at this timing is a progress rate of 30%.

Since the progress rate of the detailed information on the error detection (2) is increasing (0%→30%), the collection monitoring unit 103 determines that the progress monitoring is continuously performed (see reference numeral "C10" in FIG. 8). The collection monitoring unit 103 also sets a progress monitoring interval (interval setting (2)). This secondly-set progress monitoring interval is referred to as an interval ii.

Here, in the BMC 10, as a result of the plurality of error detections (1) to (3) being performed, since the log collection unit 102 performs three detailed information collections in parallel, the load on the log collection unit 102 increases. Accordingly, the interval iii for the error detection (2) is longer than the interval i.

In the meantime, the collection of the detailed information 105 on the error detection (1) by the log collection unit 102 is completed, and the reporting unit 104 sends the detailed information 105 (second report) to the management server 3 (the detailed information report (1) (second report): see reference numeral "B16" in FIG. 8).

After that, since the interval ii has elapsed, the collection monitoring unit 103 monitors (checks) the progress of collection of the detailed information for the log collection unit 102 (see reference numeral "C11" in FIG. 8). The progress monitoring for the error detection (2) is referred to as progress monitoring (2). In the example illustrated in FIG. 8, the result of the progress monitoring (1) at this timing is a progress rate of 80%.

Since the progress rate of the detailed information on the error detection (2) is increasing (30%→80%), the collection monitoring unit 103 determines that the progress monitoring is continuously performed (see reference numeral "C12" in FIG. 8). The collection monitoring unit 103 also sets a progress monitoring interval. This thirdly-set progress monitoring interval is referred to as an interval iii.

Here, in the BMC 10, since the collection of the detailed information on error detection (1) is completed, the load on the log collection unit 102 is reduced. This makes the interval iii shorter than the interval ii.

Since the interval iii has elapsed, the collection monitoring unit 103 monitors (checks) the progress of collection of the detailed information for the log collection unit 102 (see reference numeral "C13" in FIG. 8). In the example illustrated in FIG. 8, the result of the progress monitoring (2) at this timing is a progress rate of 100%.

Since the progress rate of the detailed information on the error detection (2) has reached 100%, the collection monitoring unit 103 determines that the progress monitoring has been completed (see reference numeral "C14" in FIG. 8).

The collection monitoring unit 103 instructs the reporting unit 104 to report the detailed information 105 on the error detection (2) (detailed information report instruction (2): see reference numeral "C15" in FIG. 8). According to this instruction, the reporting unit 104 reports the detailed information 105 (second report) to the management server 3 (detailed information report (2) (second report): see reference numeral "C16" in FIG. 8).

Next, according to a flowchart (steps S01 to S06) illustrated in FIG. 9, descriptions will be made on the outline of a process of the collection monitoring unit 103 in the BMC 10 included in the information processing apparatus 2 of the remote maintenance system 1 according to the embodiment.

Figure 9:
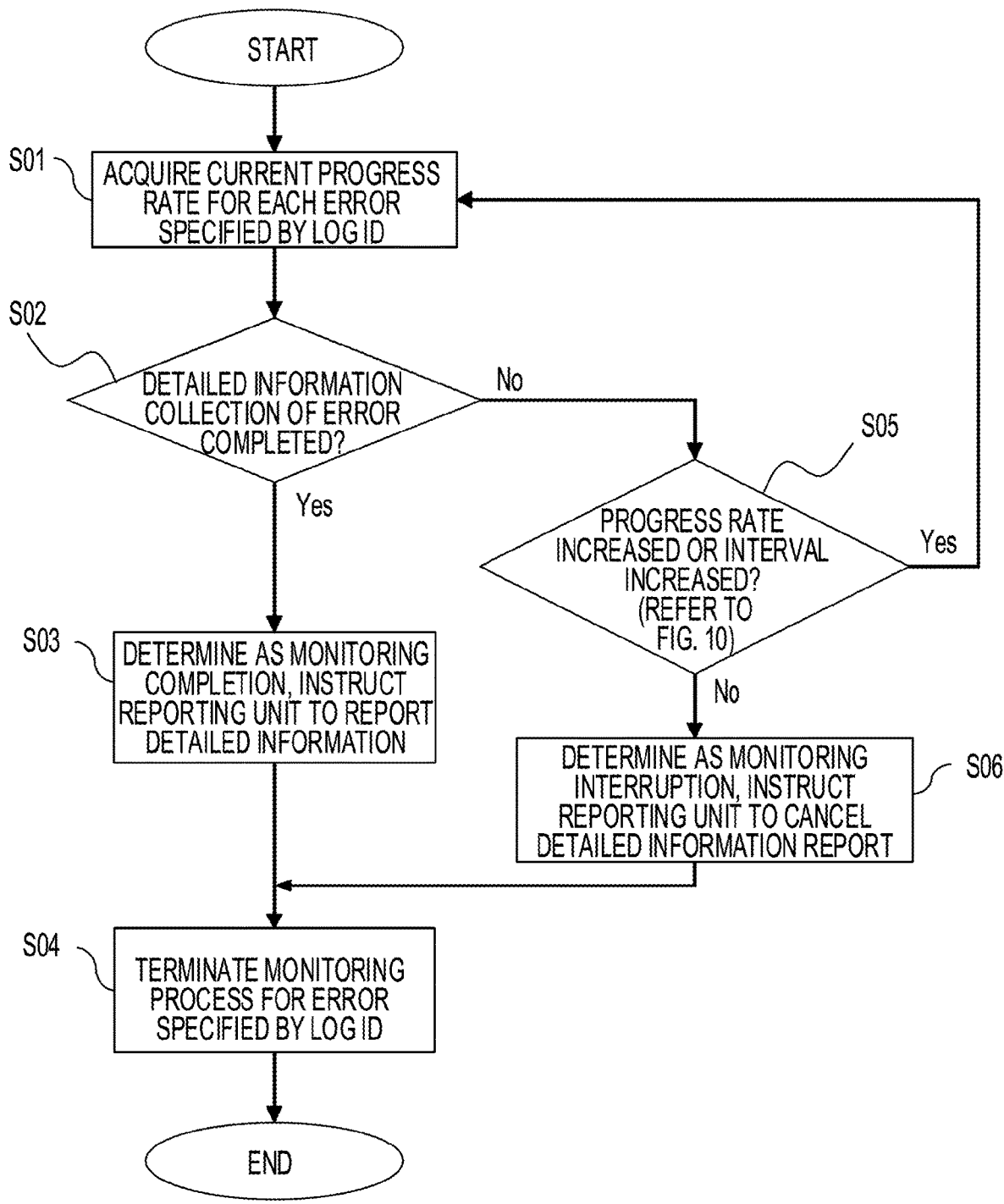
FIG. 9 is a flowchart for explaining the outline of a process of a collection monitoring unit in a BMC included in the information processing apparatus in the remote maintenance system according to the embodiment.

The process illustrated in FIG. 9 is performed for each of the individual errors detected by the error detection unit 101.

In step S01, the collection monitoring unit 103 acquires the current progress rate of collection of the detailed information 105 by the log collection unit 102 for an error identified by a log ID.

In step S02, the collection monitoring unit 103 checks whether the collection of the detailed information 105 by the log collection unit 102 for the target error has been completed based on the acquired progress rate.

When it is checked that the collection of the detailed information 105 has been completed ("Yes" in step S02), the process proceeds to step S03.

In step S03, the collection monitoring unit 103 determines that the monitoring for the error has been completed, and instructs the reporting unit 104 to send the collected detailed information 105.

In step S04, the collection monitoring unit 103 terminates the monitoring process for the error identified by the log ID and ends the process.

When it is checked in step S02 that the collection of the detailed information 105 has not been completed ("No" in step S02), the process proceeds to step S05 in FIG. 9.

In step S05, the collection monitoring unit 103 checks whether one of the conditions "the progress rate is increasing" and "the progress monitoring interval is increasing" is satisfied. The details of step S05 will be described later according to a flowchart illustrated in FIG. 10.

When it is checked in step S05 that one of the conditions "the progress rate is increasing" and "the progress monitoring interval is increasing" is satisfied ("Yes" in step S05), the process returns to step S01. That is, the collection monitoring unit 103 continuously monitors the error.

In the meantime, when it is checked in step S05 that none of the conditions "the progress rate is increasing" and "the progress monitoring interval is increasing" is satisfied ("No" in step S05), the process proceeds to step S06.

In step S06, the collection monitoring unit 103 determines that the monitoring for the error is to be discontinued, and notifies the reporting unit 104 of the cancellation of the report of the detailed information 105. As a result, the detailed information 105 on the error is not reported to the management server 3. Thereafter, the process proceeds to step S04.

Figure 10:
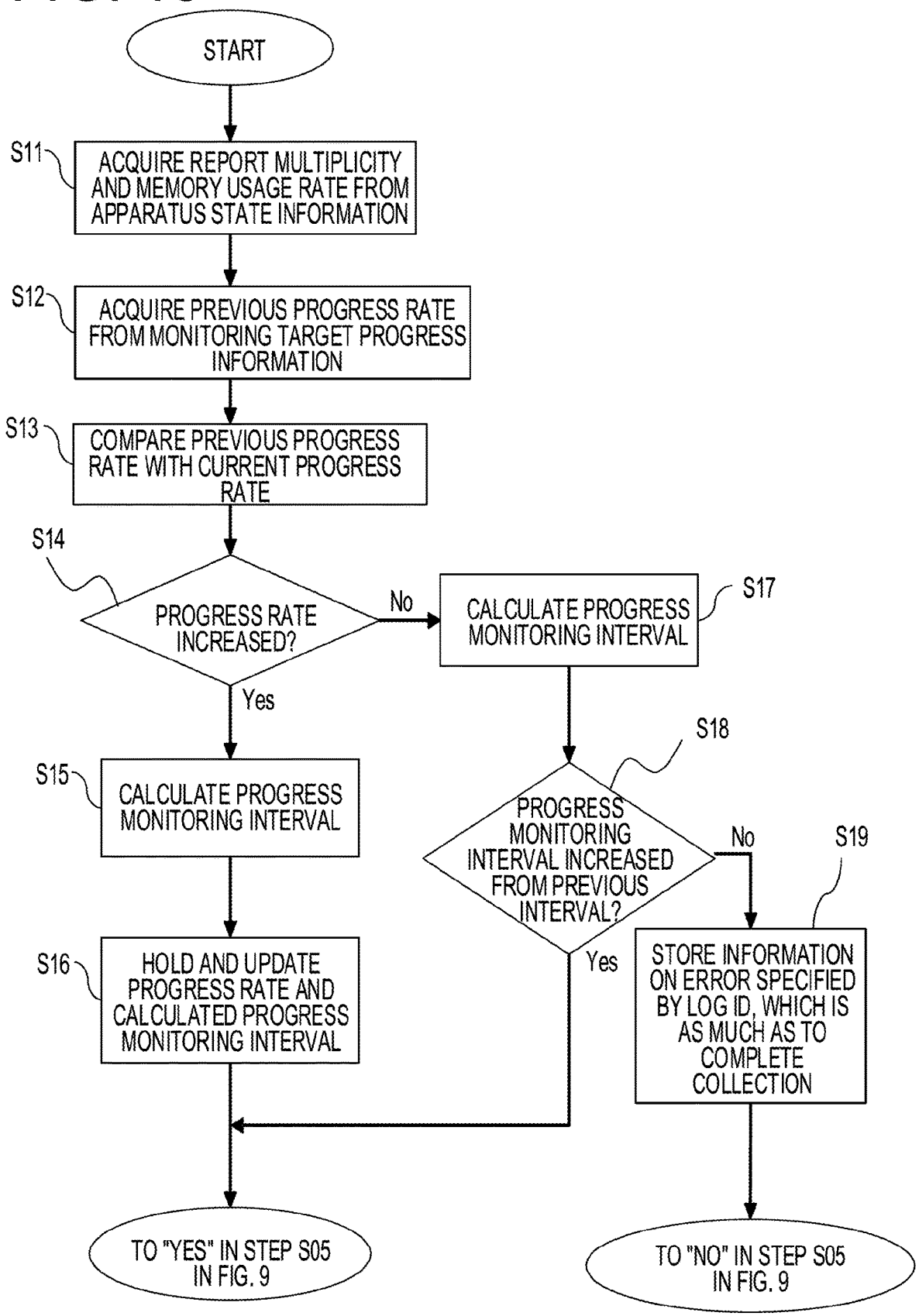
FIG. 10 is a flowchart for explaining the details of step S05 in FIG. 9.

Next, the details of step S05 in FIG. 9 will be described according to the flowchart (steps S11 to S19) illustrated in FIG. 10.

In step S11, the collection monitoring unit 103 refers to the apparatus state information 107 to acquire the report multiplicity and the memory usage rate.

In step S12, the collection monitoring unit 103 refers to the monitoring target progress information 108 to acquire the previous progress rate.

In step S13, the collection monitoring unit 103 compares the previous progress rate with the current progress rate.

In step S14, as a result of the comparison in step S13, the collection monitoring unit 103 checks whether the progress rate has increased, that is, whether the current progress rate is larger than the previous progress rate.

When it is checked that the progress rate has increased ("Yes" in step S14), the process proceeds to step S15.

Figure 11:
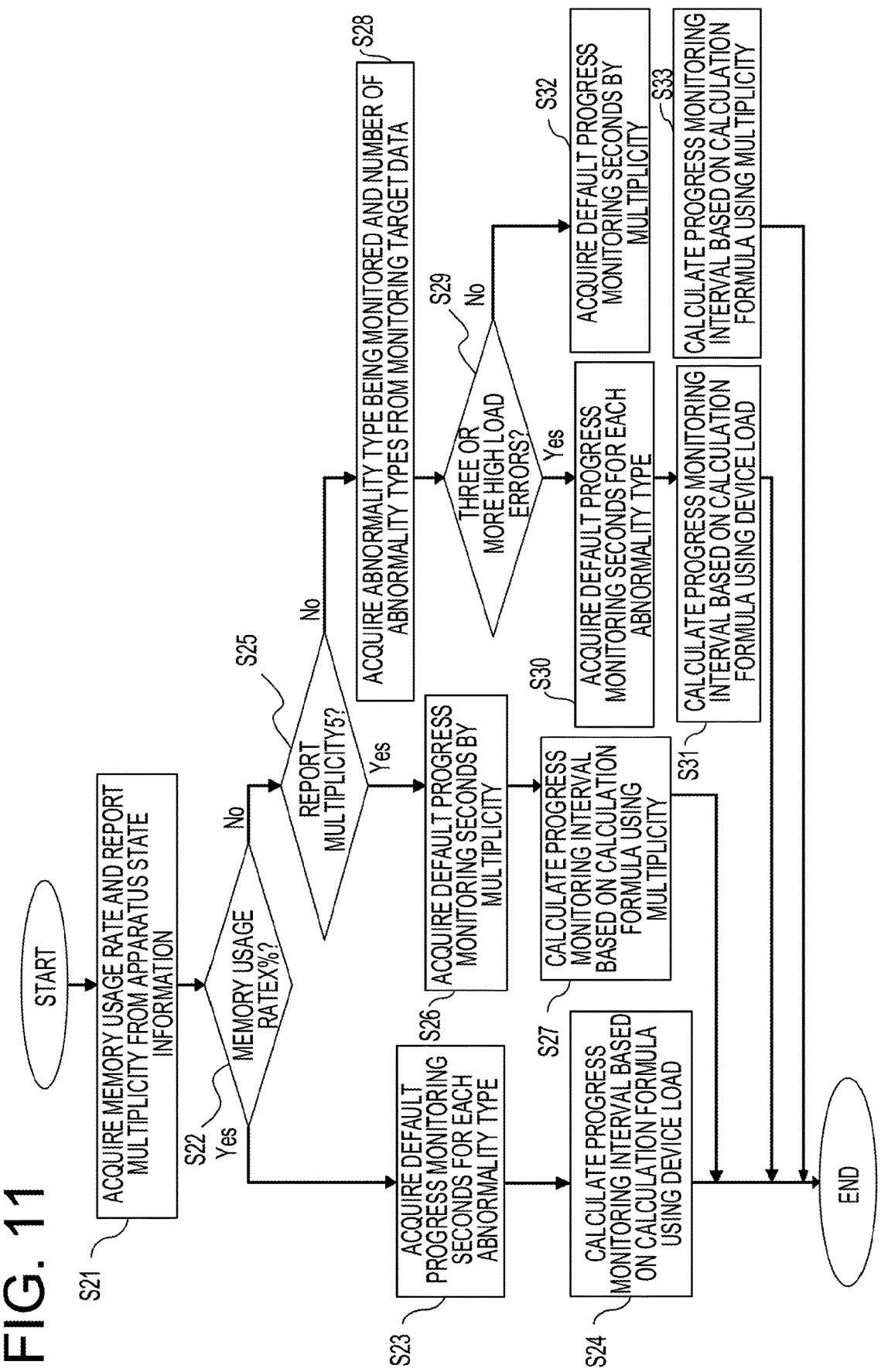
FIG. 11 is a flowchart for explaining the details of steps S15 and S17 in FIG. 10.

In step S15, the collection monitoring unit 103 calculates a progress monitoring interval. The details on how to calculate the progress monitoring interval will be described later using a flowchart illustrated in FIG. 11.

In step S16, the collection monitoring unit 103 updates the monitoring target progress information 108 by storing (holding) the current progress rate and the progress monitoring interval calculated in step S15. The progress monitoring interval newly calculated in step S15 is held in the monitoring target progress information 108 as the current interval. Thereafter, the process returns to step S01 according to the "Yes" route of step S05 in FIG. 9.

When it is checked in step S14 that the progress rate is not increasing ("No" in step S14), the process proceeds to step S17.

In step S17, the collection monitoring unit 103 calculates a progress monitoring interval. The details on how to calculate the progress monitoring interval will also be described later according to the flowchart illustrated in FIG. 11.

Thereafter, in step S18, the collection monitoring unit 103 checks whether the progress monitoring interval newly calculated in step S15 has increased from the previous interval of the monitoring target progress information 108.

When it is checked that the newly calculated progress monitoring interval has increased from the previous interval ("Yes" in step S18), the process returns to step S01 according to the "Yes" route in step S05 of FIG. 9.

In the meantime, when it is checked in step S18 that the newly calculated progress monitoring interval has not increased from the previous interval ("No" in step S18), the process proceeds to step S19.

In step S19, the collection monitoring unit 103 stores, as the detailed information 105, information on the error identified by the log ID, which is as much as to complete the collection.

Thereafter, the process proceeds to step S06 according to the "No" route of step S05 of FIG. 9.

Next, the details of steps S15 and S17 in FIG. 10 will be described according to the flowchart (steps S21 to S33) illustrated in FIG. 10.

In step S21, the collection monitoring unit 103 refers to the apparatus state information 107 to acquire the memory usage rate and the report multiplicity. In step S22, the collection monitoring unit 103 checks whether the memory usage rate is equal to or higher than x %.

When it is checked that the memory usage rate is equal to or higher than x % ("Yes" in step S22), the process proceeds to step S23. In step S23, the collection monitoring unit 103 refers to the error definition information 106 to acquire a default progress monitoring second number for each abnormality type. That is, the collection monitoring unit 103 acquires the default progress monitoring second number corresponding to the anomaly type of the detected error.

In step S24, the collection monitoring unit 103 calculates the progress monitoring interval based on the calculation formula (1) using the device load (the load on the BMC 10). Thereafter, the process is ended.

When it is checked in step S22 that the memory usage rate is lower than x % ("No" in step S22), the process proceeds to step S25.

In step S25, the collection monitoring unit 103 checks whether the report multiplicity is equal to or higher than 5 which is the first threshold value.

When it is checked that the report multiplicity is equal to or higher than 5 ("Yes" in step S25), the process proceeds to step S26. In step S26, the collection monitoring unit 103 refers to the error definition information 106 to acquire a default progress monitoring second number by multiplicity.

In step S27, the collection monitoring unit 103 calculates the progress monitoring interval based on the calculation formula (2) using the multiplicity. Thereafter, the process is ended.

When it is checked in step S25 that the report multiplicity is lower than 5 ("No" in step S25), the process proceeds to step S28. In step S28, the collection monitoring unit 103 refers to the monitoring target progress information 108 to acquire the number of errors being monitored (occurring in the information processing apparatus 2) and the abnormality type of each error.

In step S29, the collection monitoring unit 103 checks on the errors occurring in the information processing apparatus 2 whether three or more high load errors have occurred.

When it is checked that three or more high load errors have occurred ("Yes" in step S29), the process proceeds to step S30.

In step S30, the collection monitoring unit 103 refers to the error definition information 106 to acquire a default progress monitoring second number for each abnormality type. That is, the collection monitoring unit 103 acquires a default progress monitoring second number corresponding to the abnormality type of the detected error.

In step S31, the collection monitoring unit 103 calculates a progress monitoring interval based on the calculation formula (1) using the device load (the load of the BMC 10). Thereafter, the process is ended.

When it is checked in step S29 that three or more high load errors have not occurred ("No" in step S29), the process proceeds to step S32.

In step S32, the collection monitoring unit 103 refers to the error definition information 106 to acquire a default progress monitoring second number by multiplicity.

In step S33, the collection monitoring unit 103 calculates a progress monitoring interval based on the calculation formula (2) using the multiplicity. Thereafter, the process is ended.

Figure 12:
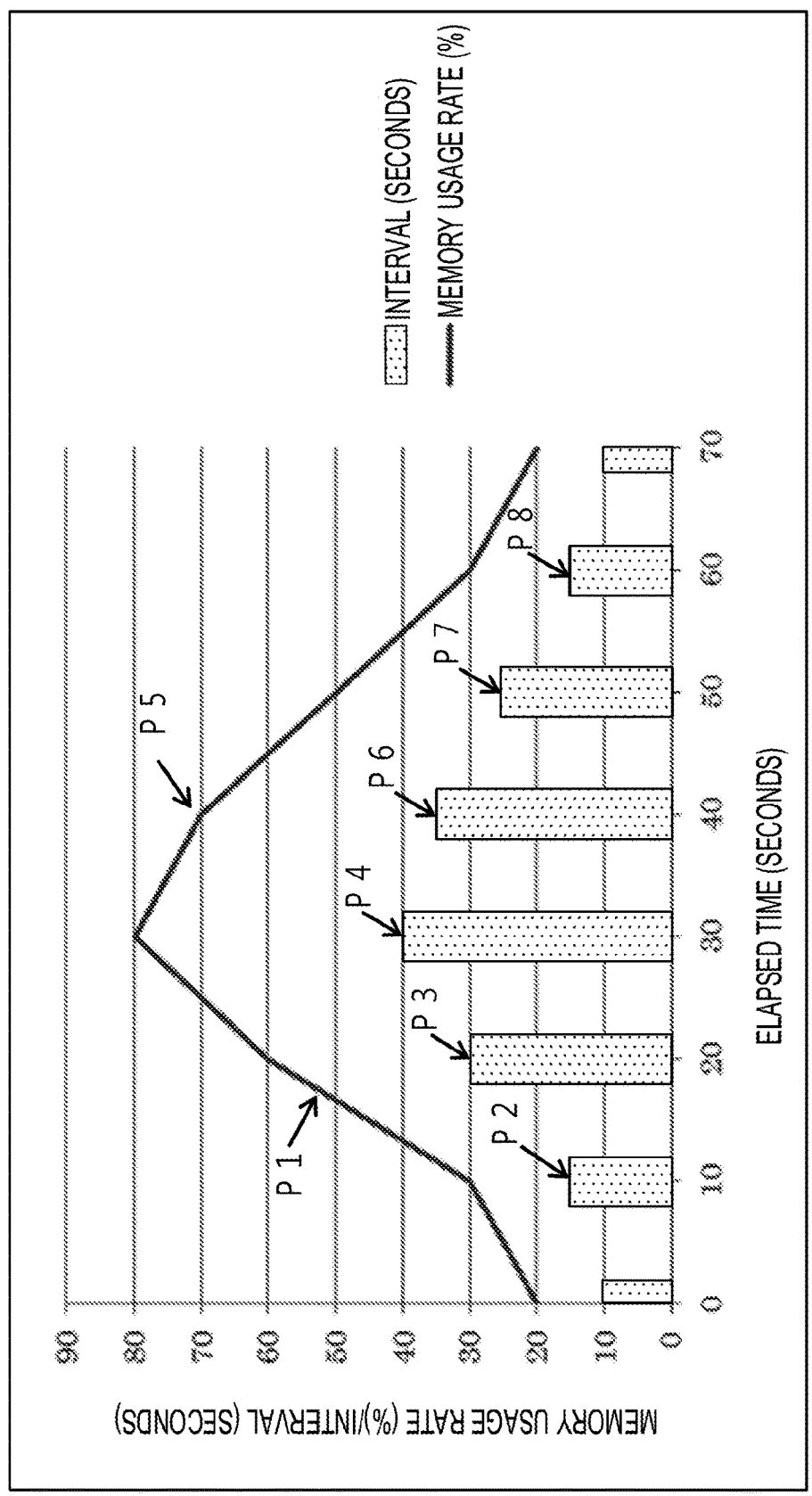
FIG. 12 is a view illustrating transition of a progress monitoring interval for a memory usage rate in the remote maintenance system according to the embodiment.

FIG. 12 is a view illustrating transition of a progress monitoring interval for the memory usage rate in the remote maintenance system 1 according to the embodiment.

In the example illustrated in FIG. 12, it is assumed that an error occurs in the PSU 40 of the information processing apparatus 2 and an error occurs in each of the CPU 21 and the memory 22 operated by the PSU 40 as well.

In FIG. 12, the horizontal axis represents the elapsed time (seconds) from the occurrence of an error, and the vertical axis represents the memory usage rate (%) and the progress monitoring interval (seconds).

When errors are detected at a plurality of locations in the information processing apparatus 2, the log collection unit 102 collects the detailed information 105 for each of these errors. Therefore, the load on the BMC 10 increases and the memory usage rate of the memory 12 increases with the lapse of time (see reference numeral "P1" in FIG. 12).

In addition, when the BMC 10 is in a high load state, since the collection monitoring unit 103 calculates the progress monitoring interval using the above calculation formula (1) using the memory usage rate, the progress monitoring interval also becomes longer (see reference numerals "P2" to "P4" in FIG. 12).

Thereafter, when the collection of the detailed information 105 by the log collection unit 102 is completed, the load on the BMC 10 is reduced, and the memory usage also decreases (see reference numeral "P5" in FIG. 12). Accordingly, the progress monitoring interval calculated by the collection monitoring unit 103 also becomes shorter (see reference numerals "P6" to "P8" in FIG. 12).

(C) Effects

In this way, according to the remote maintenance system 1 according to the embodiment, in the BMC 10 included in the information processing apparatus 2, the collection monitoring unit 103 calculates a progress monitoring interval according to the load state of the BMC 10.

For example, when the BMC 10 is in a high load state, the progress monitoring interval becomes longer in the high load state by determining the progress monitoring interval using a calculation formula that uses the device load (memory usage rate). As a result, it is possible to reduce the inquiry frequency of progress monitoring whether the collection of the detailed information 105 by the log collection unit 102 has been completed and hence to efficiently collect and monitor the detailed information 105.

In the meantime, when the BMC 10 is not in a high load state (non-high load state), the time taken for the collection of the detailed information 105 by the log collection unit 102 is a value corresponding to the report multiplicity (the number of simultaneous occurrences of errors). Therefore, when the BMC 10 is not in a high load state in this manner, the collection monitoring unit 103 calculates the progress monitoring interval using a calculation formula that uses the report multiplicity and checks the progress at this progress monitoring interval, so that the collection and monitoring of the detailed information 105 may be performed efficiently.

By changing the progress monitoring interval according to the load state of the BMC 10, the collection monitoring unit 103 may reliably collect the detailed information 105 without causing a timeout in the detailed information collection.

In the management server 3, since the detailed information 105 may cope with errors, the reliability of the remote maintenance system 1 may be improved.

In addition, even when the memory usage rate of the BMC 10 is lower than a threshold value and there is not high report multiplicity (lower than the first threshold value), when many high load errors (higher than the second threshold value) occur in the BMC 10, the progress monitoring interval is determined using a calculation formula that uses the device load (memory usage rate). Even in this case, it is possible to reduce the inquiry frequency of progress monitoring as to whether the collection of the detailed information 105 by the log collection unit 102 has been completed and hence to collect and monitor the detailed information 105 with high efficiency.

The collection monitoring unit 103 continues collecting the detailed information when there is a progress in the collection of the detailed information 105 by the log collection unit 102 or when there is an increase in the progress monitoring interval by recalculating the progress monitoring interval. As a result, even when the BMC 10 is in a high load state and it takes time to collect the detailed information 105, the detailed information 105 may be reliably collected.

In addition, since timeout of the detailed information collection does not occur, the detailed information 105 may be reliably collected.

Further, when there is no progress in the collection of the detailed information 105 by the log collection unit 102 for a detected error and there is no increase in the progress monitoring interval even when the progress monitoring interval is recalculated, the collection monitoring unit 103 ends the monitoring process with detailed information collection abnormality.

As a result, when a detailed information collection abnormality occurs in the BMC 10, the detailed information is not collected endlessly in a frozen state, so that the process may be performed efficiently.

The detailed information 105 that may be analyzed is sent to the management server 3 (the maintenance center) regardless of the load state of the BMC 10 included in the information processing apparatus 2. Further, the time (progress monitoring interval) for waiting for the detailed information collection by the log collection unit 102 in the BMC 10 may be appropriately set according to the load on the BMC 10.

(D) Others

The disclosed technology is not limited to the above-described embodiment, but various modifications may be made and practiced without departing from the spirit and scope of the present embodiment. The configurations and processes of the present embodiment may be selected as needed, or may be used in proper combination.

For example, in the above-described embodiment, a weight (W) may be set for each abnormality type, and the weight may be reflected in the progress monitoring interval.

FIG. 13 is a view illustrating a weight for each abnormality type in the remote maintenance system 1 according to a modification of the embodiment.

In the example illustrated in FIG. 13, weights 2, 1, 5 and 3 are respectively set for four abnormality types CDU (Coolant/Distribution Unit), PSU, CPU, and MEM. Such weights may be set according to the importance of the detailed information 105, or may be set according to the time required to collect the detailed information 105. Hereinafter, a method of calculating a progress monitoring interval using the weights according to the present modification will be described.

In the example illustrated below, it is assumed that the default progress monitoring second number by multiplicity is one second and the number of CDUs, PSUs, CPUs, and MEMs mounted on the information processing apparatus 2 is 1, 3, 6 and 12, respectively.

In the present modification, the collection monitoring unit 103 calculates a progress monitoring interval according to the following formula (3).

$$\text{Progress monitoring interval } (s) = \text{Default progress monitoring interval by multiplicity} \times \text{Report multiplicity } (m) \times \text{Weight for each abnormality type } (w) \quad (3)$$

For example, a progress monitoring interval for the CDU failure in a state where only the CDU failure occurs (report multiplicity=1) is calculated as follows based on the above equation (3). It is assumed that the default progress monitoring interval by multiplicity is 1, the report multiplicity is 1, and the weight of CDU is 2.

Progress monitoring interval (s)=1'1'2=2 seconds

Figure 14:
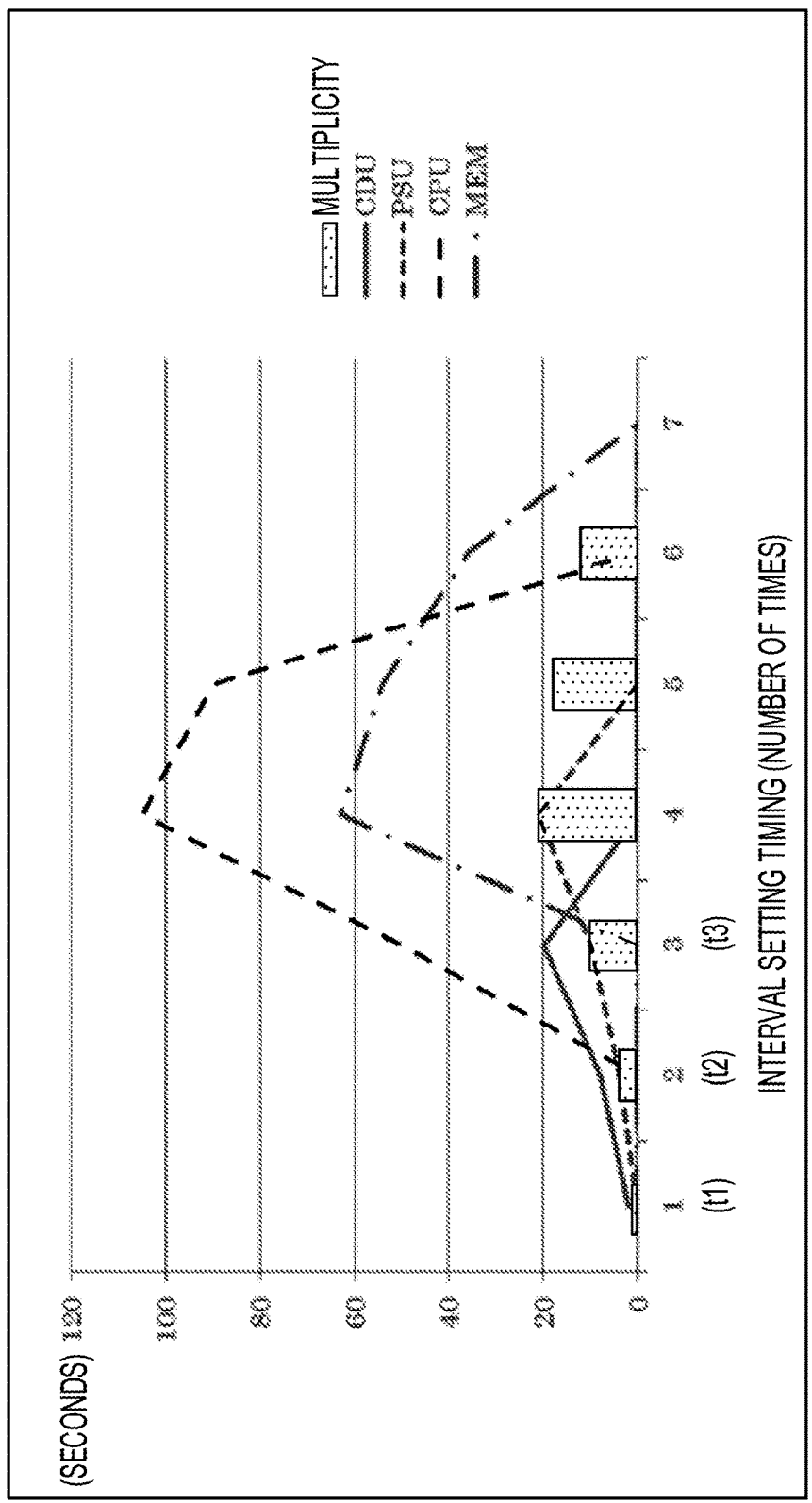
FIG. 14 is a view illustrating transition of a progress monitoring interval for a memory usage rate in the remote maintenance system according to a modification of the embodiment.
Figure 15:
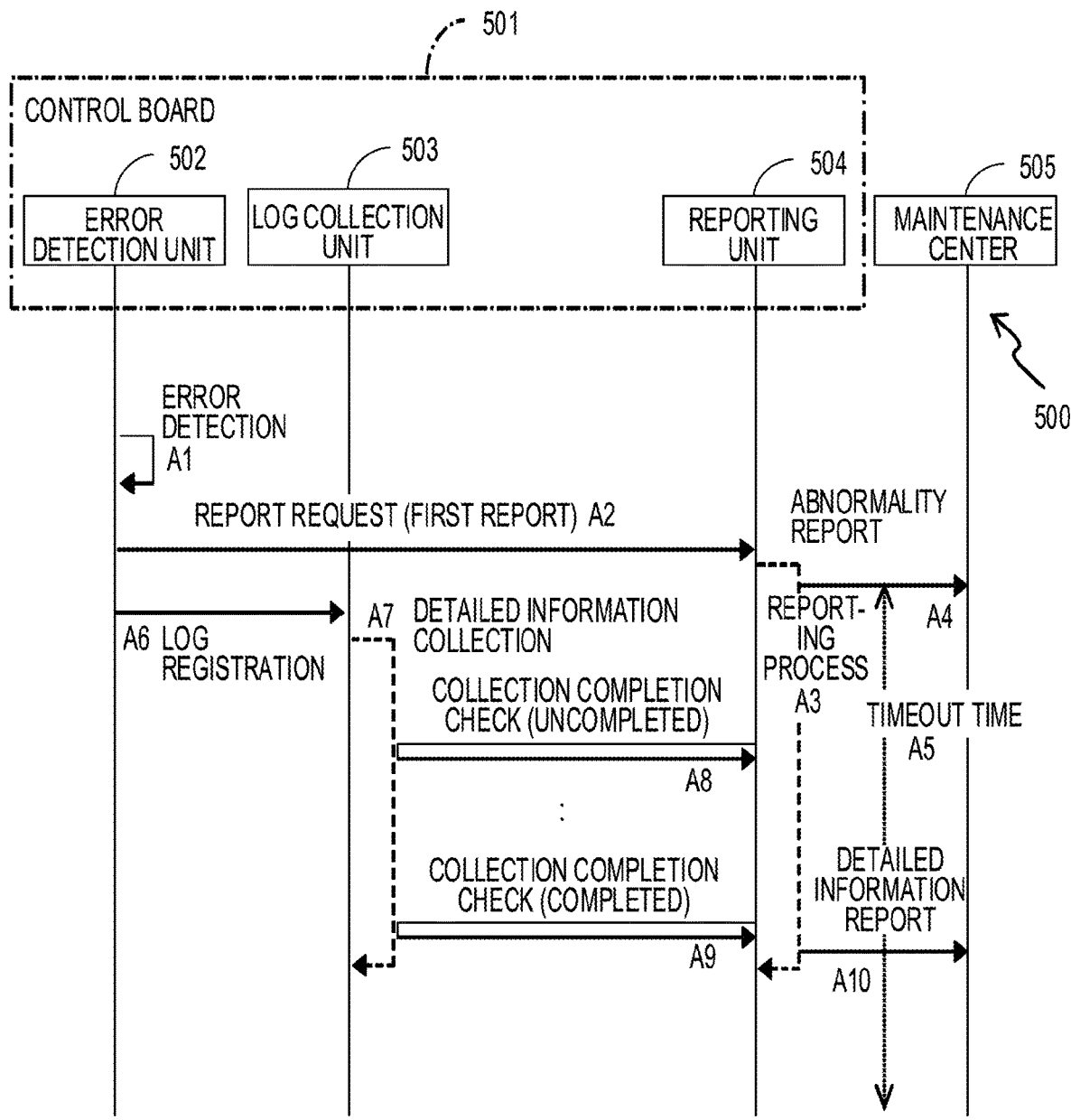
FIG. 15 is a sequence diagram for explaining a process at the time of error detection in a remote maintenance system of the related art.

FIG. 14 is a view illustrating transition of a progress monitoring interval for the memory usage rate in the remote maintenance system 1 according to a modification of the embodiment.

In the example illustrated in FIG. 14, in the information processing apparatus 2, an error first occurs in the CDU (time t1) and errors occur (multiple occurrence) in the PSU and CPU that have been cooled by the CDU (time t2). Thereafter, a corresponding MEM error occurs (time t3) due to the CPU error.

In FIG. 14, the horizontal axis represents the setting timing (number of times) of a progress monitoring interval, and the vertical axis represents the progress monitoring interval (seconds) and the multiplicity.

When errors are respectively detected at a plurality of places (CDU, PSU, CPU, and MEM) in the information processing apparatus 2, the log collection unit 102 collects the detailed information 105 for each of these errors.

As a result, in the example illustrated in FIG. 14, the loads on the CPU 11 and the MEM 12 increase to the fourth interval setting timing (multiplicity=4) at which the error multiplicity becomes the highest, and accordingly, the progress monitoring interval for these errors becomes longer.

In addition, at the transition of the fourth interval setting timing, the collection of the detailed information 105 of certain errors is completed and the load on the BMC 10 is accordingly reduced. As a result, the progress monitoring interval for each error is shortened.

In this way, according to the remote maintenance system 1 of the modification of the present disclosure, in addition to the same operations and effects as those of the above-described embodiment, it is possible to set a progress monitoring interval depending on the weight by setting a weight for each abnormality type. Thus, for example, it is possible to lengthen the progress monitoring interval and hence reliably collect the detailed information 105 by setting a high weight to an important abnormality type.

In the above-described embodiment, although the remote maintenance system 1 includes one information processing apparatus 2 and one management server 3, the present disclosure is not limited thereto but may be modified and practiced as appropriate. For example, the remote maintenance system 1 may include two or more information processing apparatuses 2 and two or more management servers 3.

Although it has been illustrated in the above-described embodiment that the determination as to whether the BMC 10 is in a high load state is made by checking whether the memory usage rate of the BMC 10 is equal to or higher than a threshold value, the present disclosure is not limited thereto. For example, it may be determined whether the BMC 10 is in a high load state by determining whether the usage rate of the CPU 11 or the number of processes executed in parallel is equal to or higher than a predetermined threshold value, and other various modifications may be implemented. Then, a state where the CPU usage rate or the number of processes executed in parallel is lower than the threshold value may be set as the reference state.

Moreover, it is possible for those skilled in the art to implement and manufacture the present embodiment from the above disclosure.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A monitor comprising:
a memory; and
a processor coupled to the memory and the processor configured to:
detect an error that occurs in an information processing apparatus;
collect information on the detected error;
calculate an interval for checking a progress of the collection of the information based on a default reference monitoring time and a value corresponding to a memory usage rate or a multiplicity of errors;
check the progress of the collection of the information when the interval elapses;
output the collected information when the collection of the information is completed; and
continue the collection of the information without timing-out monitoring of the error when there is a progress in collecting the information or when a value of the interval is increased from a previously calculated value of the interval.

2. The monitor according to claim 1, wherein the processor is further configured to calculate the interval depending on a state of a load on the monitor.

3. The monitor according to claim 2, wherein the processor is further configured to calculate the interval by multiplying the default reference monitoring time by the value corresponding to the memory usage rate when the load on the monitor is higher than a predetermined reference state, the reference monitoring time being defined for each abnormality type.

4. The monitor according to claim 2, wherein the processor is further configured to calculate the interval by multiplying the default reference monitoring time by a value corresponding to the multiplicity of errors when the load of the monitor is lower than a predetermined reference state.

5. A monitoring control method comprising:
detecting, by a computer, an error that occurs in an information processing apparatus;
collecting, by the computer, information on the detected error;
calculating, by the computer, an interval for checking a progress of the collection of the information based on a default reference monitoring time and a value corresponding to a memory usage rate or a multiplicity of errors;
checking, by the computer, the progress of the collection of the information when the interval elapses;
outputting, by the computer, the collected information when the collection of the information is completed; and
continuing, by the computer, the collection of the information without timing-out monitoring of the error when there is a progress in collecting the information or when a value of the interval is increased from a previously calculated value of the interval.

6. The monitoring control method according to claim 5, further comprising calculating the interval depending on a state of a load on the computer.

7. The monitoring control method according to claim 6, further comprising calculating the interval by multiplying the default reference monitoring time by the value corresponding to the memory usage rate when the load on the computer is higher than a predetermined reference state, the reference monitoring time being defined for each abnormality type.

8. The monitoring control method according to claim 6, further comprising calculating the interval by multiplying the default reference monitoring time by the value corresponding to the multiplicity of errors when the load of the computer is lower than a predetermined reference state.

9. A non-transitory computer-readable recording medium having stored therein a program that causes a computer to execute a process, the process comprising:
   detecting, by the computer, an error that occurs in an information processing apparatus;
   collecting, by the computer, information on the detected error;
   calculating, by the computer, an interval for checking a progress of the collection of the information based on a default reference monitoring time and a value corresponding to a memory usage rate or a multiplicity of errors;
   checking, by the computer, the progress of the collection of the information when the interval elapses;
   outputting, by the computer, the collected information when the collection of the information is completed; and
   continuing, by the computer, the collection of the information without timing-out monitoring of the error when there is a progress in collecting the information or when a value of the interval is increased from a previously calculated value of the interval.

10. The non-transitory computer-readable recording medium according to claim 9, the process further comprising calculating the interval depending on a state of a load on the computer.

11. The non-transitory computer-readable recording medium according to claim 10, the process further comprising:
    calculating the interval by multiplying the default reference monitoring time by the value corresponding to the memory usage rate when the load on the computer is higher than a predetermined reference state, the reference monitoring time being defined for each abnormality type.

12. The non-transitory computer-readable recording medium according to claim 10, the process further comprising:
    calculating the interval by multiplying the default reference monitoring time by the value corresponding to the multiplicity of errors when the load of the computer is lower than a predetermined reference state.

\* \* \* \* \*